Figure 1:
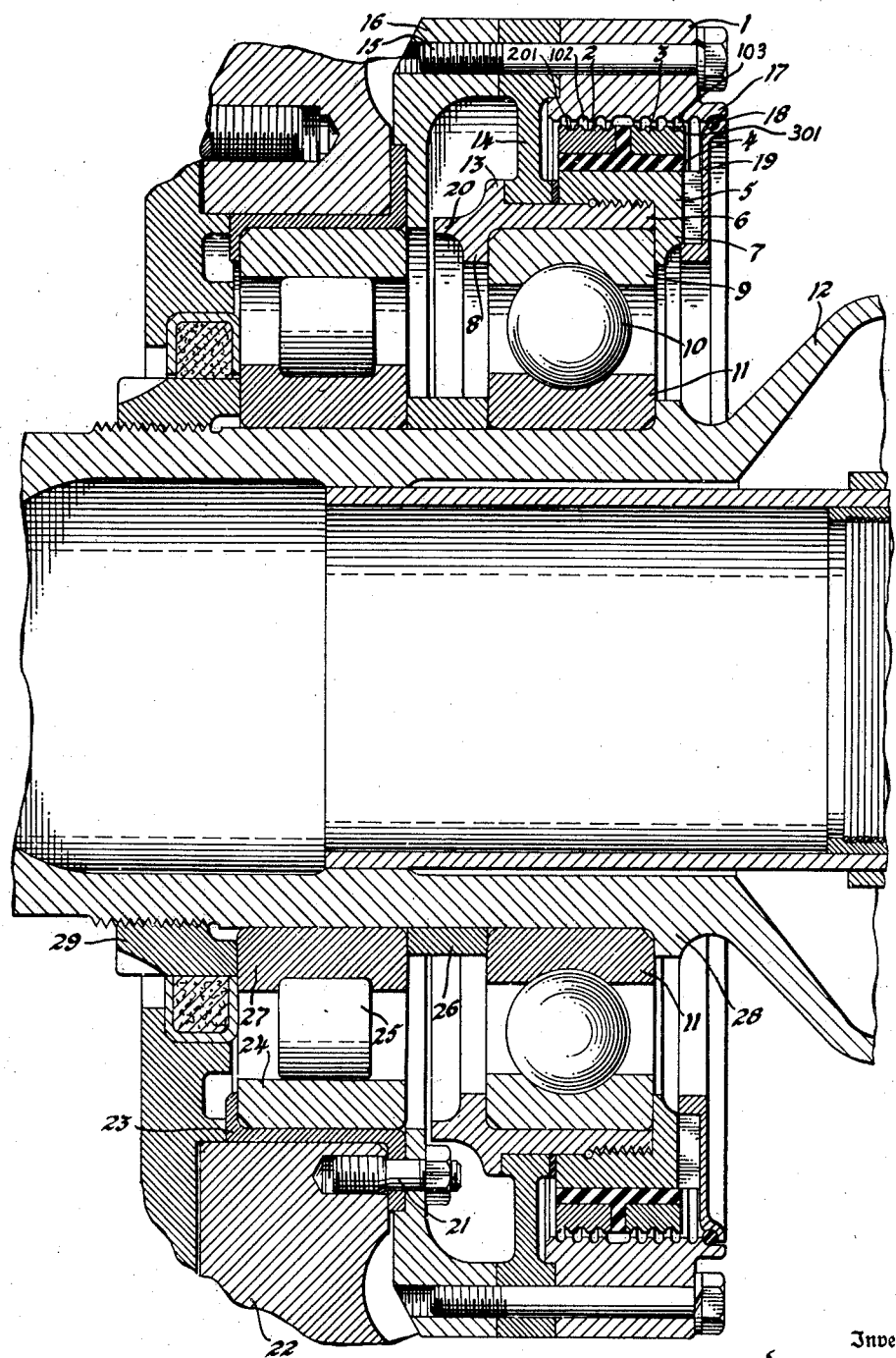

Jan. 9, 1945. A. W. GARDINER 2,367,017
THRUST METER
Filed Sept. 10, 1943 3 Sheets-Sheet 1

Inventor
Arthur W. Gardiner
By
Blackmore, Spencer & Flint
Attorneys

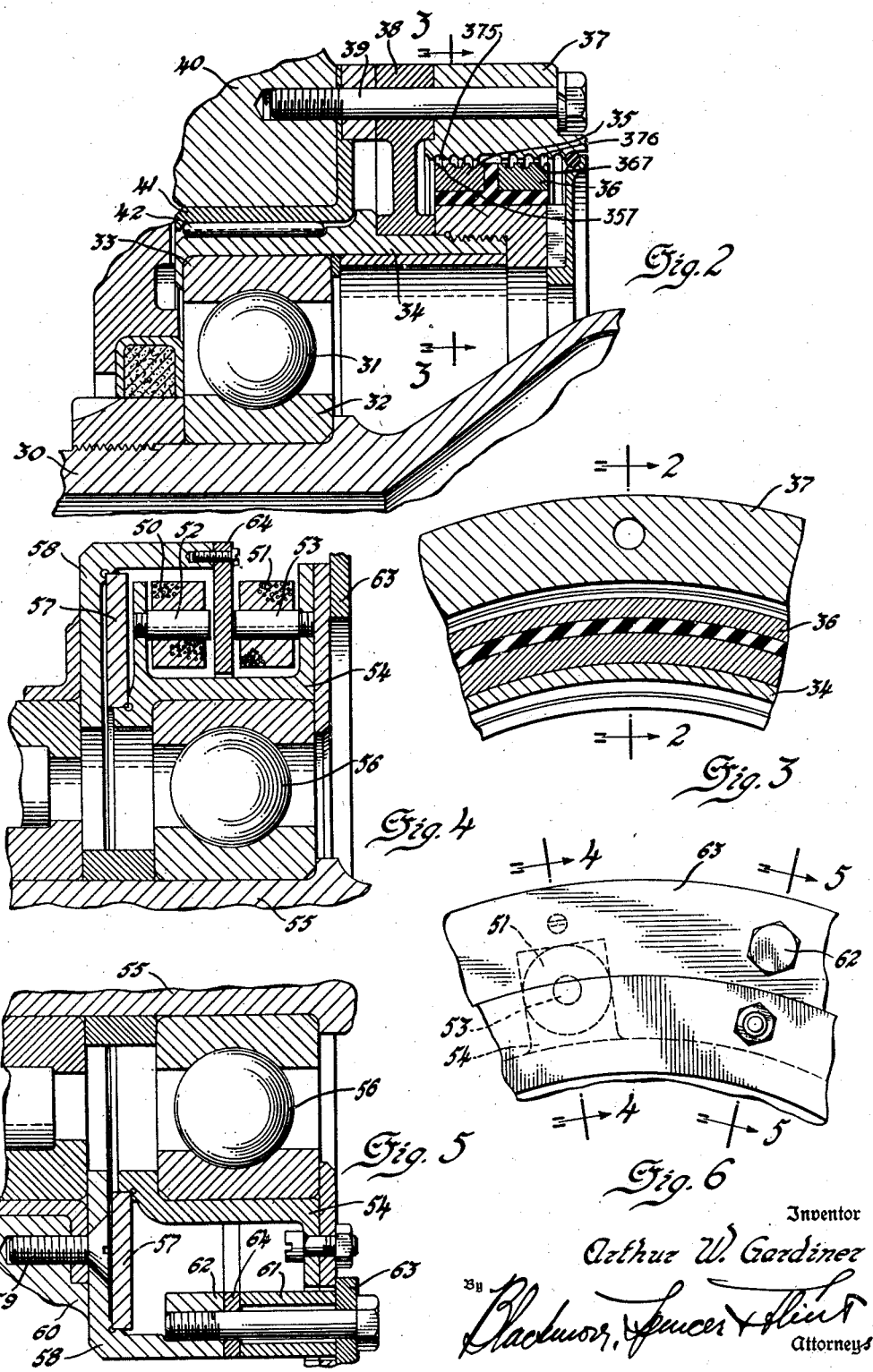

Jan. 9, 1945.　　　A. W. GARDINER　　　2,367,017
THRUST METER
Filed Sept. 10, 1943　　　3 Sheets-Sheet 3
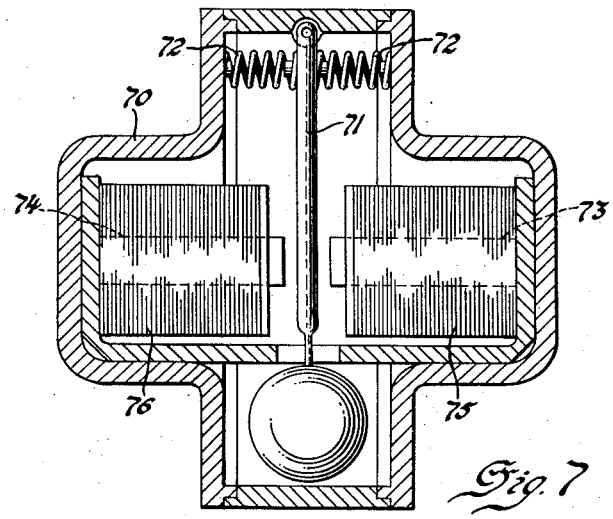
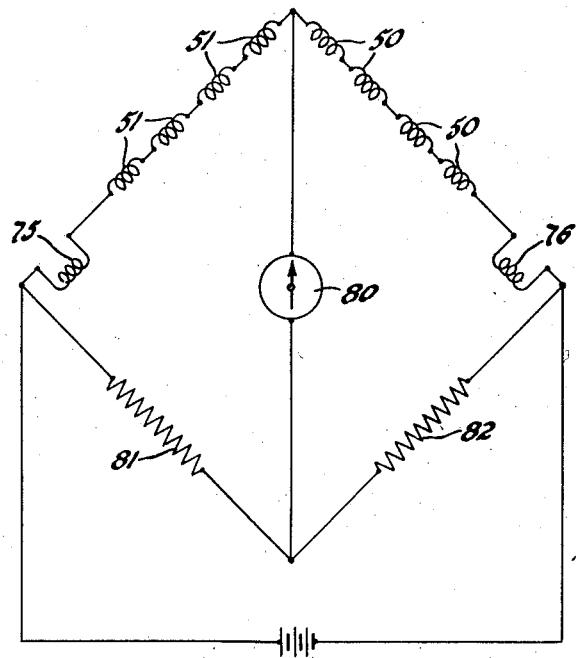
Inventor
Arthur W. Gardiner
By
Blackmore, Spencer & Flint
Attorneys Patented Jan. 9, 1945

2,367,017

UNITED STATES PATENT OFFICE 2,367,017

THRUST METER

Arthur W. Gardiner, Indianapolis, Ind., assignor to General Motors Corporation, Detroit, Mich., a corporation of Delaware Application September 10, 1943, Serial No. 501,803

5 Claims. (Cl. 73—140)

This invention relates to aircraft powered by an engine driven rotating propeller and more particularly to an improved structure for giving an indication of the thrust exerted by the propeller. In general the system involves the use of an electrical circuit whose charge is varied by the degree of propeller thrust and is readable on a meter at the pilot's instrument panel. When applied to an airplane driven by several propellers the pilot can tell at all times the relative thrust exerted by each of the several propellers in order better to maintain control. An object of the invention is to provide an improved structure associated with the propeller drive shaft and responsive to minute changes in propeller thrust for varying the current in the meter circuit.

Additional objects and advantages will become apparent in the course of the following specification having reference to the accompanying drawings wherein Figure 1 is a longitudinal sectional view of a propeller shaft mounting having incorporated therein a variable condenser structure; Figure 2 is a similar view representing a modification; Figure 3 is a fragmentary transverse section on line 3—3 of Figure 2; Figures 4 and 5 are companion longitudinal sections showing a form of the invention employing inductor coils for changing current flow in response to propeller thrust and these two views may be considered as taken on lines 4—4 and 5—5 of Figure 6; Figure 6 is a fragmentary end view of the structure of Figures 4 and 5; Figure 7 is a detail sectional view of a gravity compensating coil for additional insertion in series with the thrust responsive current modifying devices to nullify the gravity effect on the propeller during plane climb and dive operations and Figure 8 is a bridge diagram.

The variable condenser of Figure 1 consists of a stationary grounded outer ring 1 and a pair of cooperating inner rings 2 and 3 in concentric non-rotatable relation with the outer ring 1 but movable axially thereof. The air gap between adjacent faces of the inner and outer rings is made of variable size by forming in each a series of axially spaced annular grooves or projecting ribs as the case may be so that by reason of the spaced complemental corrugated faces high and low regions are provided and relative axial displacement of the rings varies condenser capacity. A set of grooves 201 on the periphery of the ring 2 and a set of grooves 301 on the periphery of the ring 3 provide the corrugated faces for cooperation with complementary corrugated faces on the grounded ring 1 afforded by two sets of grooves 102 and 103, respectively. The inner rings 2 and 3 are suitably connected in differen parts of an electrical circuit and are insulated from each other and from their associated mounting parts by a T sectioned insulator 4 carried by a nut 5. This nut 5 is threaded on a floating sleeve 6 and has an inwardly projecting flange 7 to clamp against an inwardly projecting flange 8 on the sleeve 6 an outer race 9 for the bearing balls 10, whose inner race 11 is fixed on the propeller drive shaft 12 for axial thrust movement therewith. The nut 5 in cooperation with an outwardly projecting flange 13 on the floating sleeve 6, also secures the sleeve to a stiff ring 14 of substantially I section whose rim is fixed by a number of fastening bolts 15 to a mounting ring 16. The reduced intermediate portion of the I section ring 14 is so formed as to impart thereto a certain amount of flexibility to accommodate propeller shaft thrust and the movement under thrust of the axially floating sleeve assembly, including the condenser rings 2 and 3. The cooperating condenser ring 1 is fixedly located by the fastening screws 15 and terminates in an axial rib 17 to seat a rubber sealing ring 18 carried by a cover 19 detachably keyed to the retaining nut 5 to exclude dirt and foreign matter from the condenser faces.

To restrict maximum relative movement of the floating assembly under propeller thrust the sleeve 6 terminates in an abutment nose 20 adapted to bottom on the mounting ring 16 with the intervening space shown in the drawings representing the limited extent of relative movement. Attachment bolts 21 secure the mounting ring 16 to the stationary housing 22 as well as the retainer 23 for the outer cylindrical race 24 on which ride the roller bearings 25. A spacer 26 is interposed between the inner bearing race 27 and the inner ball race 11 and these parts are located fixedly between a shoulder 28 integral with the propeller shaft 12 and a securing nut 29 threaded on the propeller shaft 12.

As will be apparent, driving propeller shaft thrust which tends to pull the shaft toward the left in Figure 1 and shift the condenser rings 2 and 3 axially of the stationary grounded ring 1 and the hill and valley formations in the adjacent condenser ring faces are so displaced that increased peripheral rib area of the ring 2 comes into alignment with the rib area on the ring 1 while decreased peripheral rib area on the ring 3 is presented to the rib area of the ring 1. Thus the effective electrostatic capacity between the condenser rings 1 and 2 is increased while that between the condenser rings 1 and 3 is decreased and the differential is reflected in the current charge of the circuits and so indicated on the instrument board meter scale for reading the thrust force. Decrease in thrust force is correspondingly indicated. It is, of course, elemental that any change in the relative positions of the condenser rings will change the capacity which can be read on a meter in a bridge circuit containing the rings.

The same result is had with the structure of Figure 2, which differs only in that a simplified arrangement of supporting bearing is afforded. In this case the thrust and radial load of the propeller shaft 30 is carried by the bearing balls 31 whose inner race 32 is fixed to the propeller shaft with the outer race 33 fixed to an extension of the floating sleeve 34. The sleeve 34 carries the insulated condenser rings 35 and 36 for cooperation with the grounded condenser ring 37 and is carried by the flexible wall 38 secured by attachment bolts 39, which also secure the ring 37 to the stationary housing 40. Complementary corrugated faces in the rings 37 and 35 are formed by annular grooves 375 and 357, respectively, while sets of grooves 367 and 376 form complementary corrugated faces in the rings 36 and 37. Between the housing 40 and the sleeve 34 is a bearing liner 41 for a series of needle bearings or pins 42 which accommodate axial adjustment of the sleeve and take the radial load. If desired a plain sliding bearing can be substituted for the needle bearings to take radial load. Bearings for the radial load relieve the elastic ring or wall and simplify its design, but such radial load bearings could be omitted, in which case radial load will be transmitted by the ball bearings 31 (Figure 2) or 10 (Figure 1) into the flexible ring 38 or 14.

Optionally the condensers may be replaced by two groups of inductor coils. Each group may consist of four coils placed 90° apart and conveniently each coil of one group is aligned with one of the coils of the other group. Thus in Figure 4 a pair of aligned coils are shown at 50 and 51 surrounding iron cores 52 and 53, respectively, carried by the floating non-rotatable sleeve 54, whose position varies with thrust of the propeller shaft 55 and is mounted on the propeller shaft through the ball bearing assembly 56. A high rate preloaded Belleville spring 57 is interposed between the floating sleeve 54 of magnetic machine steel and the stationary ring 58 of non-magnetic stainless steel fastened by mounting screws 59 to the stationary support 60. Also carried by the ring 58 at circumferentially spaced locations are a number of spacer tubes 61 and cooperating attachment studs 62 for fastening a cover plate 63, which among other things serves as a limit abutment for the floating sleeve under the force of the thrust resisting Belleville spring 57. By means of the studs 62 the Belleville spring 57 is preloaded and remains in place during periods of light thrust load when the engine is idling. A magnetic soft steel armature ring 64 projects centrally between the adjacent ends of the two cores 52 and 53 and the intervening space determines the inductance of the coils. Thus on forward thrust of the propeller shaft 55 the inductance of the coil 51 increases and that of the coil 50 decreases in relation to the extent of displacement of the floating sleeve assembly and the variations can be metered at the pilot's instrument panel.

It will be understood that either the elastic ring 14 or the Belleville spring 57 may be employed with the condenser pickup or the coil pickup. Selection of the condenser pickup contemplates the use of high frequency current while selection of the coil pickup contemplates the use of low frequency current.

Inasmuch as the propeller and its associated parts weigh in the neighborhood of four hundred pounds in an exemplary installation, gravity forces, when the airplane is not in horizontal flight, may affect the position of the floating sleeve and the condensers or coils as the case may be and thus give an inaccurate reading of propeller thrust force. Accordingly it is desirable for most satisfactory installation to compensate for gravity disturbance and for this purpose the device of Figure 7 is proposed. It includes a fixed housing 70 in which is pivotally suspended a dependent weighted pendulum 71 having opposed centering springs 72 and hanging centrally between the ends of a pair of aligned iron cores 73 and 74 within coils 75 and 76, respectively. When the plane is in a dive the pendulum 71 swings toward the core 74 and away from the core 73 while in plane climb the pendulum swings toward the core 73 and away from the core 74. Thus the forward compensating coil 76 can be placed in series with the main coil 50 and the rear compensating coil 75 in series with the main coil 51 to balance the circuit for measuring actual power thrust.

This arrangement is better understood from the diagram Figure 8 illustrating a conventional bridge having the usual current meter 80. The compensating coil 76 is shown in series with a group of main coils 50 while a compensating coil 75 is in series with the group of coils 51. Balancing resistances are indicated at 81 and 82. Inductance at the coil 51 increases with forward propeller thrust and inductance at the coils 50 decreases. As will be understood with a decrease in forward propeller thrust the inductance decreases at the coils 51 and increases at the coils 50 and the relation is read at the measurement meter 80. The device described compensates not only for gravity, but also for acceleration. Instead of the embodiment of coils in the compensator, appropriate condenser elements can be substituted for use with the condenser type thrust meter. Movable condensers can be part of the arm 71 and stationary condensers can be part of the housing 70.

I claim:

1. In an airplane installation having a propeller drive shaft subject to drive thrust, a stationary support for the drive shaft, current charge indicating means, current charge modifying devices having relatively movable elements coupled to the support and shaft, respectively, in circuit with said means, a pair of current modifying devices in series respectively with those first mentioned and a gravity responsive tilting arm cooperating with said pair of devices to compensate for shaft thrust incident to plane climb and dive operations.

2. In combination, a thrust receiving member, a supporting member, an annular flexible web secured at its inner and outer margins to said members, respectively, a pair of condenser rings carried by one of said members, a band of electrical insulating material interposed between said rings and its carrying member to insulate the rings electrically from one another and from said member, a grounded condenser ring carried by the other member in nested relation to said pair of rings and ridge formations on the adjoining cooperating faces of said rings.

3. In combination, a grounded condenser ring having circumferential grooves in an axially extending face thereof, a support therefor, a flexible annular wall marginally clamped between said ring to the support, a thrust receiving sleeve having a shoulder seated on the other margin of said wall, a nut threaded on the sleeve to clamp the wall margin against said shoulder, a band of insulating material carried by said nut and a pair of condenser rings insulated by said band and positioned thereby in cooperative face relation to the first mentioned condenser ring, both of the insulated rings having in their faces circumferential grooves cooperatively related to the grooves in the first mentioned condenser ring.

4. In combination, a supporting housing, a ball thrust bearing, a floating sleeve mounting therefor having a peripherally formed shouldered seat, a flexible supporting wall engaging said seat and thereby locating the sleeve for limited axial travel within the housing, a pair of independent current modifying devices carried by the sleeve for movement therewith, and an electrically grounded member fixed to the housing for cooperation in common with both of said independent devices.

5. In combination, a stationary housing, a rotatable propeller shaft bearing in the housing, a grounded condenser ring surrounding the shaft and fixed to the housing, a flexible support wall peripherally bolted to the housing, a floating sleeve supported by the inner edge of the flexible wall and formed at one end with inwardly and outwardly radially extending flanges, a ball thrust bearing having its inner race fixed to said shaft and its outer race fixed within said sleeve, a retainer collar threaded on the opposite end of the sleeve and cooperating with said end flanges to clamp thereagainst the outer race and the inner edge of said wall, respectively, a pair of condenser rings carried by said collar in nested concentric relation to said grounded condenser ring and means electrically insulating said pair of condenser rings from each other and the collar.

ARTHUR W. GARDINER.